(12) United States Patent
Patel

(10) Patent No.: US 6,249,867 B1
(45) Date of Patent: Jun. 19, 2001

(54) METHOD FOR TRANSFERRING SENSITIVE INFORMATION USING INITIALLY UNSECURED COMMUNICATION

(75) Inventor: Sarvar Patel, Montville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/127,766

(22) Filed: Jul. 31, 1998

(51) Int. Cl.$^7$ ...................................... G06F 11/30

(52) U.S. Cl. ...................... 713/167; 713/171; 713/200; 713/201; 380/255; 380/258; 380/278; 380/283

(58) Field of Search ..................... 713/167, 171, 713/182, 189, 200, 201; 380/255, 258, 278, 283

(56) References Cited

U.S. PATENT DOCUMENTS 3,263,218 * 7/1966 Anderson .......................... 340/172.5
3,530,438 * 9/1970 Mellen et al. ..................... 340/172.5

(List continued on next page.)

OTHER PUBLICATIONS

M. Bellare and P. Rogaway, Entity authentication and key distribution, *Advances in Cryptology—Crypto*, 1993.
S. Bellovin and M. Merritt, Encrypted key exchange: password–based protocols secure against dictionary attacks, *IEEE computer society symposium on research in security and privacy*, 72–84 May 1992.
R. Bird, I. Gopal, A. Herzberg, P. Janson, S. Kutten, R. Molva, and M. Yung, Systematic design of two–party authentication protocols, *Advances in Cryptology—Crypto*, 1991.
M. Blum and S. Micali, How to generate cryptograghically strong sequences of pseudo random bits, *SIAM J. Computing*, 13 No. 4:850–864, 1984.
R. B. Boppana and R. Hirschfeld, Pseudorrandom generators and complexity classes, *Advances in Computing Research*, 5 ( S. Micali, Ed.), JAI Press, CT.
U.S. Department of Commerce/N.I.S.T., *Digital Signature Standard*, FIPS 186, May 1994.
O. Goldreich and L. A. Levin, A hard–core predicate for all one way functions, *Proceedings of 21$^{st}$ STOC*, 25–32, 1989.
S. Goldwasser and A. Micali, Probabilistic encryption, *Journal of Computer and Systems Science*, 28: 270–299, 1984.

(List continued on next page.)

*Primary Examiner*—Thomas R. Peeso

(57) ABSTRACT

In the method for transferring sensitive information using unsecured communication, a first party receives a public key of a second party, produces an encryption result by performing keyed encryption on at least a first random number using the public key, and transfers the encryption result to the second party over an unsecured communication channel. The second party decrypts the encryption result to obtain the first random number. Authorizing information is then transferred from the first party to the second party over a first encrypted and authenticated communication channel established using the first random number. Sensitive information is further transferred from the second party to the first party over a second encrypted and authenticated communication channel established using the first random number if the second party accepts the authorizing information. Numerous applications exist for the system and method, including the wireless industry wherein the first party is a mobile and the second party is a network.

17 Claims, 2 Drawing Sheets

U.S. PATENT DOCUMENTS

| | | | |
|---|---|---|---|
| 3,839,706 | * 10/1974 | Borchsenius | 711/207 |
| 3,845,425 | * 10/1974 | Clements et al. | 711/152 |
| 5,153,919 | 10/1992 | Reeds, III et al. . | |

OTHER PUBLICATIONS

L. Gong, T. Lomas, R. Needham and J. Saltzer, Protecting poorly chosen secrets from guessing attacks, *IEEE Journal on Selected Areas in Communications*, 11(5): 648–656, Jun. 1993.

EIA/TIA, Cellular Radio Telecommunications Intersystem Operations IS–41 Rev. D, 1997.

T. Lomas, L. Gong, J. Saltzer and R. Needham, Reducing Risks from Poorly Chosen Keys, *Proceedings of the 12th ACM Symposium on Operating System Principles*, 23(5): 14–18, Dec. 1989.

S. Patel, Information Leakage in Encrypted Key Exchange, *Prceedings of DIMACS workshop on Network Threats*, 38: 33–40, Dec. 1996.

S. Patel, Number theoretic attacks on secure password chemes, *IEEE symposium on security and privacy*, 236–247, May 1997.

S. Patel, Weaknesses of the north american wireless authentication protocol, *IEEE Personal Communications*, 40–44, Jun. 1997.

A. C. Yao, Theory and applications of trapdoor functions, *Proceedings of 23rd FOCS*, 80–91, 1982.

M. Beller, L. Chang and Y. Yacobi, Privacy and authentication on a portable communication system, *IEEE J. Selected Areas in Communications*, 11(6): 821–829, 1993.

C. Carroll, Y. Frankel and Y. Tsiounis, Efficient key distribution for slow computing devices: Achieving fast over the air activation for wireless systems, *IEEE symposium on security and privacy*, May 1998.

TIA/EIA Interim Standard, *Over–the–Air Service Provisioning of Mobile Stations in Spread Spectrum Systems*, IS–683–A, Jun. 1998.

E. Blossom, The VPI Protocol for Voice Privacy Devices, Dec. 1996.

O. Goldreich, S. Goldwasser and A. Micali, On the cryptographic applications of random functions, *Advances in Cryptology—Crypto*, 1984.

D. Jablon, Strong Password–Only Authenticated Key Exchange, *ACM SIG–COMM Computer Communications Review*, Oct. 1996.

S. Lucks, Open Key Exchange: How to defeat dictionary attacks without encrypting public keys, Proceedings of the Security Protocol Workshop '97, 1997.

Oded Goldreich, Shafi Goldwasser, Silvio Micali, How to Construct Random Functions, Journal of the Association for Computing Machinery, vol. 33, NO. 4, pp. 792–807, Oct. 1986.

* cited by examiner

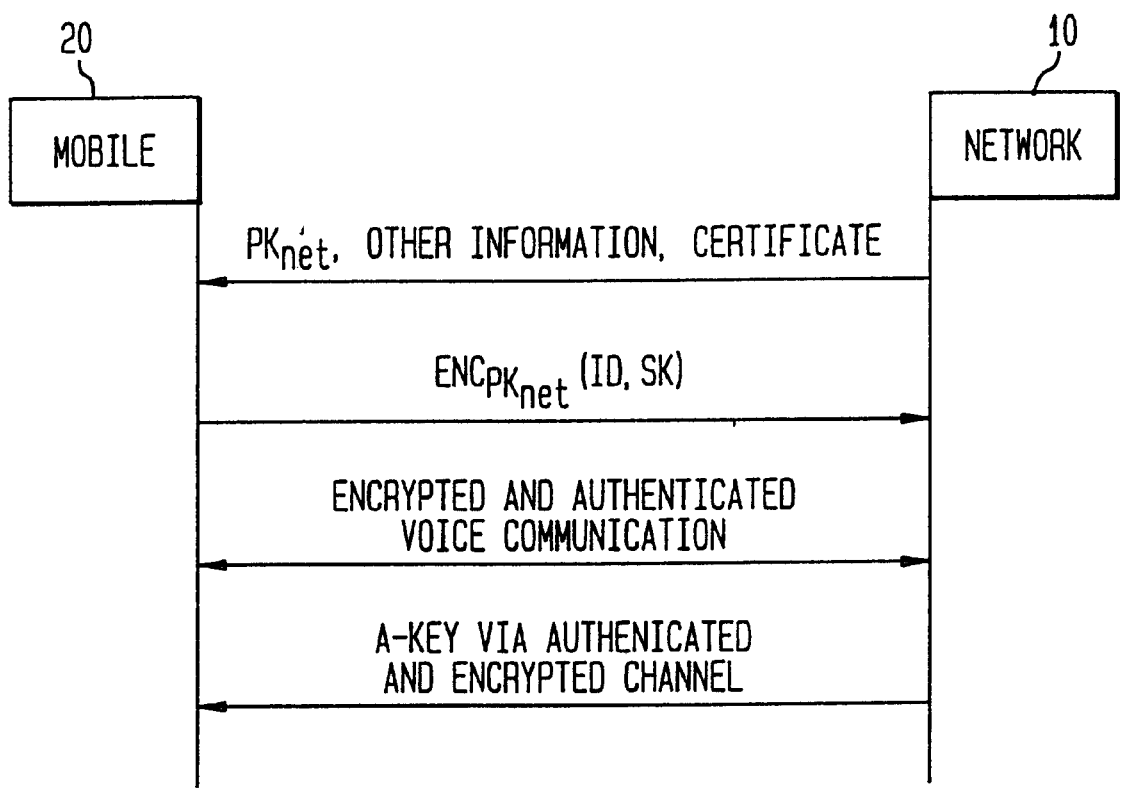

METHOD FOR TRANSFERRING SENSITIVE INFORMATION USING INITIALLY UNSECURED COMMUNICATION

RELATED APPLICATIONS

The following applications, filed concurrently with the subject application, are related to the subject application and are hereby incorporated by reference in their entirety: application Ser. No. 09/127,767 entitled METHOD FOR TWO PARTY AUTHENTICATION AND KEY AGREEMENT by the inventor of the subject application; application Ser. No. 09/127,768 entitled METHOD FOR UPDATING SECRET SHARED DATA IN A WIRELESS COMMUNICATION SYSTEM by the inventor of the subject application; Ser. No. 09/127,045 entitled METHOD FOR SECURING OVER-THE-AIR COMMUNICATION IN A WIRELESS SYSTEM by the inventor of the subject application; Ser. No. 09/127,769 entitled METHOD FOR ESTABLISHING A KEY USING OVER-THE-AIR COMMUNICATION AND PASSWORD PROTOCOL AND PASSWORD PROTOCOL by the inventor of the subject application and Adam Berenzweig.

BACKGROUND OF THE INVENTION

1. Field of the Invention

The present invention relates to a method for transferring sensitive information using initially unsecured communication.

2. Description of Related Art

Certain initially unsecured communication, such as over-the-air communication, often provide great communication flexibility and efficiency as compared to initially secure forms of communication such as dedicated communication channels. Unfortunately, because communication such as over-the-air communication channels are initially unsecured, an attacker can detrimentally disrupt communication between two parties.

In a wireless communication system, the handsets, often called mobiles, purchased by mobile users are typically taken to a network service provider, and long keys and parameters are entered into the handset to activate service. The network of the service provider also maintains and associates with the mobile, a copy of the long keys and parameters for the mobile. As is well-known, based on these long keys and parameters, information can be securely transferred between the network and the mobile over-the-air.

Alternatively, the user receives the long keys over a secure communication channel (e.g., landline or mail), and must manually enter these codes into the mobile.

Because the transfer of the long keys and parameters is performed over a secure communication channel or at the network service provider as opposed to over-the-air, the transfer is secure against over-the-air attacks. However, this method of securely transferring information places certain burdens and restrictions on the mobile user. Preferably, the mobile user should be able to buy their handsets and then get service from any service provider without physically taking the handsets to the provider's location or manually entering long codes. The capability to activate and provision the mobile remotely is part of the North American wireless standards, and is referred to as "over-the-air service provisioning" (OTASP).

Currently, the North American Cellular standard IS41-C species an OTASP protocol using the well-known Diffe-Hellman (DH) key agreement for establishing a secret key between two parties (i.e., for transferring sensitive information) over an initially unsecure communication channel. FIG. 1 illustrates the application of the DH key agreement to establishing a secret key between a mobile and a network used in IS41-C. Namely, FIG. 1 shows, in a simplified form for clarity, the communication between a network 10 and a mobile 20 according to the DH key agreement. As used herein, the term network refers to the authentication centers, home register locations, visiting location registers, mobile switching centers, and base stations operated by a network service provider.

The network 10 generates a random number $R_N$, and calculates $(g \; R_N \bmod p)$. As shown in FIG. 1, the network 10 sends a 512-bit prime number p, a generator g of the group generated by p, and $(g \; R_N \bmod p)$ to the mobile 20. Next, the mobile 20 generates a random number $R_M$, calculates $(g \; R_M \bmod p)$, and sends $(g \; R_M \bmod p)$ to the network 10.

The mobile 20 raises the received $(g \; R_N \bmod p)$ from the network 10 to the power $R_M$ to obtain $(g \; R_M R_N \bmod p)$. The network 10 raises the received $(g \; R_M \bmod p)$ from the mobile 20 to the power $R_N$ to also obtain $(g \; R_M R_N \bmod p)$. Both the mobile 20 and the network 10 obtain the same result, and establish the 64 least significant bits as the long-lived key called the A-key. The A-key serves as a root key for deriving other keys used in securing the communication between the mobile 20 and the network 10.

One of the problems with the DH key exchange is that it is unauthenticated and susceptible to a man-in-the-middle attack. For instance, in the above mobile-network two party example, an attacker can impersonate the network 10 and then in turn impersonate the mobile 20 to the network 10. This way the attacker can select and know the A-key as it relays messages between the mobile 20 and the network 10 to satisfy the authorization requirements. The DH key exchange is also susceptible to off-line dictionary attacks.

Another protocol for transferring sensitive information using initially unsecured communication information initially is the Carroll-Frankel-Tsiounis (CFT) key distribution protocol (See Carroll et. al., Efficient key distribution for slow computing devices: Achieving fast over the air activation for wireless systems, IEEE Symposium on Security and Privacy, May 1998). The CFT key distribution protocol relies on the assumption that one party possesses the public key of certificate authority (CA). For purposes of discussion, this protocol will be described in detail in the context of over-the-air communication between the network 10 and the mobile 20.

A CA is a trustworthy body with its own special key. More specifically, the CA has a public key $PK_{CA}$ and a secret decrypting key $dk_{CA}$. A network service provider, for example, goes to the CA and requests that the CA sign their public key $PK_{net}$. Namely, the CA hashes the public key $PK_{net}$ along with other information, and generates a certificate for the network equal to $ENC_{dkCA}(h(PK_{net}+\text{other information}))$, which is the decryption of the hash of $PK_{net}$ and the other information using an encryption/decryption algorithm ENC and $dk_{CA}$ as the decryption key. A party with knowledge of $PK_{CA}$, then, can encrypt the certificate to obtain the hash of $PK_{net}$ and the other information. The other information represents any other information the network wants to convey with its public key.

The CFT key distribution protocol will now be described with respect to FIG. 2. FIG. 2 shows, in a simplified form for clarity, the communication between the network 10 and the mobile 20 according to the CFT key distribution protocol.

As shown, the network 10 sends its public key $PK_{net}$, other information, and the certificate to the mobile 20. Using the public key $PK_{CA}$ of the CA, the mobile 20 obtains the hash of the public key $PK_{net}$ plus the other information from the certificate. The mobile 20 also hashes the public key $PK_{net}$ plus the other information received in the clear from the network 10.

The mobile 20 then verifies the authenticity of the public key $PK_{net}$ if the result of the hash matches that obtained from the certificate. Having verified the authenticity of the public key $PK_{net}$, the mobile 20, using a random number generator disposed therein, generates a first random number as a session key SK and generates a second random number AP for verification purposes. The mobile 20 encrypts the session key SK and the random number AP according to an encryption/decryption algorithm ENC using the public key $PK_{net}$. The expression $ENC_{PKnet}(SK, AP)$ represents this encryption, and sends the encrypted result to the network 10.

The network 10 decodes the output of the mobile 20 using the decrypting key $dk_{net}$, associated with the public key $PK_{net}$, to obtain the session key SK and the random number AP. As one skilled in the art will appreciate, security requires that only the network 10 have knowledge of the decrypting key $dk_{net}$. Next, the network 10 encrypts the A-key, the root key discussed above, and the random number AP according to the encryption/decryption algorithm ENC using the session key SK, and sends the encrypted result to the mobile 20.

Using the session key SK, the mobile 20 decrypts the output of the network 10 to obtain the A-key and the random number AP. The mobile 20 then verifies whether the random number AP decoded from the output of the network 10 matches the random number AP originally sent by the mobile 20 to the network 10. If so, then the mobile 20 accepts the A-key as having come from the network 10, as opposed to an attacker, and follows any known communication protocol (e.g., IS41-C); wherein voice communication eventually takes place via encryption, but not authentication, using keys derived from the A-key. As a next step in the activation process, an encrypted voice channel is established between the mobile 20 and the network 10, and the network service provider requests authorizing information (e.g., credit card information for billing purposes) from the mobile user. Assuming the authorizing information is accepted, then the mobile user is authenticated to the network 10, and service will be provided in the future.

The CFT protocol is not secure if the A-key is repeated for OTASP with the same handset. Suppose a mobile uses its serial number to access the network for OTASP. At this point the attacker blocks the access. Next, the attacker picks a random session key SK and a random number AP and sends them to the network using the blocked mobile's serial number. The network responds with the encrypted A-key which the attacker retrieves, and then the attacker aborts the connection. Now the attacker is in possession of the A-key for that mobile. If the legitimate mobile again accesses the network with its own session key SK and random number AP, the network will again transport the same A-key to the mobile encrypting it with the session key SK from the mobile. Now the mobile will have the A-key and the user on the encrypted voice channel will give authorizing information; thus successfully completing service provisioning. Unfortunately, the attacker already has the A-key, and later he also can use it to make fraudulent calls.

One way of blocking this attack is to make it necessary that the network create a different A-key for every OTASP attempt, even if it originates from the same mobile. The authors of CFT assumed this implicitly, but this must be made explicit because a key distribution protocol should not require such a restriction. If this restriction is added, then the network can not do things like using a pseudo-random function (PRF) to associate an A-key to a mobile or other similar schemes.

Second, a mild form of denial of service attack is possible with the CFT protocol. An attacker substitutes another id number in place of the mobile's true id number throughout the protocol. The protocol will be successful but the network will not have activated the true mobile's id number. Thus, later attempts by the user to access the system will be rejected. This attack is possible because the mobile id number used in communication is not part of the public key encryption of the session key SK and the random number AP sent by the mobile to the network.

SUMMARY OF THE PRESENT INVENTION

In the method for transferring sensitive information using unsecured communication according to the present invention, a first party receives a public key of a second party, and produces an encryption result. The encryption result is produced by performing keyed encryption on at least a first random number using the public key. The first party then transfers the encryption result to the second party, and the second party decrypts the encryption result to obtain the first random number. Authorizing information is then transferred from the first party to the second party over a first encrypted and authenticated communication channel established using the first random number. Sensitive information is further transferred from the second party to the first party over a second encrypted and authenticated communication channel established using the first random number if the second party accepts the authorizing information.

In application to the wireless industry, a network in a wireless system acts as the first party, and a mobile as the second party. In this application, a root key such as the A-key is transferred as the sensitive information.

Unlike prior protocols, the method according to the present invention does not permit transfer of sensitive information until after the authorizing information has been accepted. Furthermore, by additionally performing the keyed encryption on the first party's identifier, a denial of service attack can be prevented.

BRIEF DESCRIPTION OF THE DRAWINGS

The present invention will become more fully understood from the detailed description given below and the accompanying drawings which are given by way of illustration only, wherein like reference numerals designate corresponding parts in the various drawings, and wherein:

FIG. 3 shows the communication between a network and a mobile according to the protocol of the present invention.

DETAILED DESCRIPTION OF THE PREFERRED EMBODIMENTS

Figure 1:
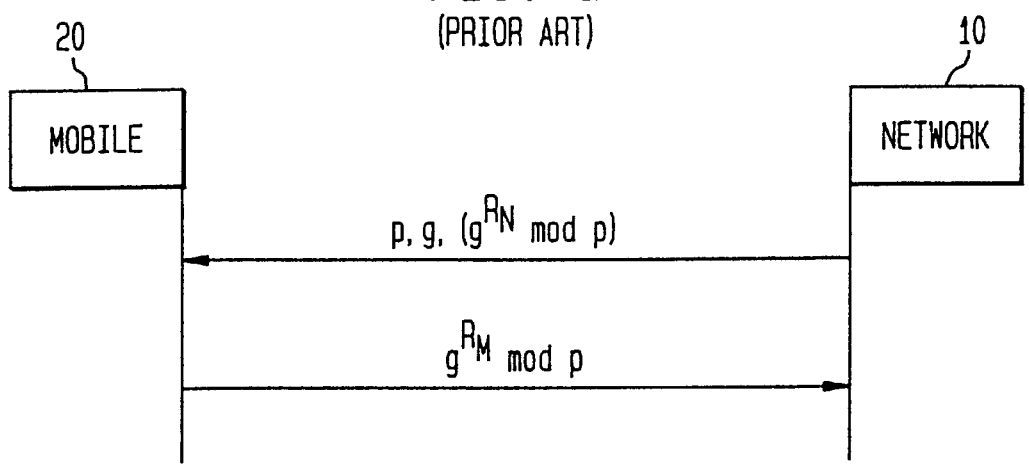
FIG. 1 shows the communication between a network and a mobile according to the Diffe-Hellman key agreement.
Figure 2:
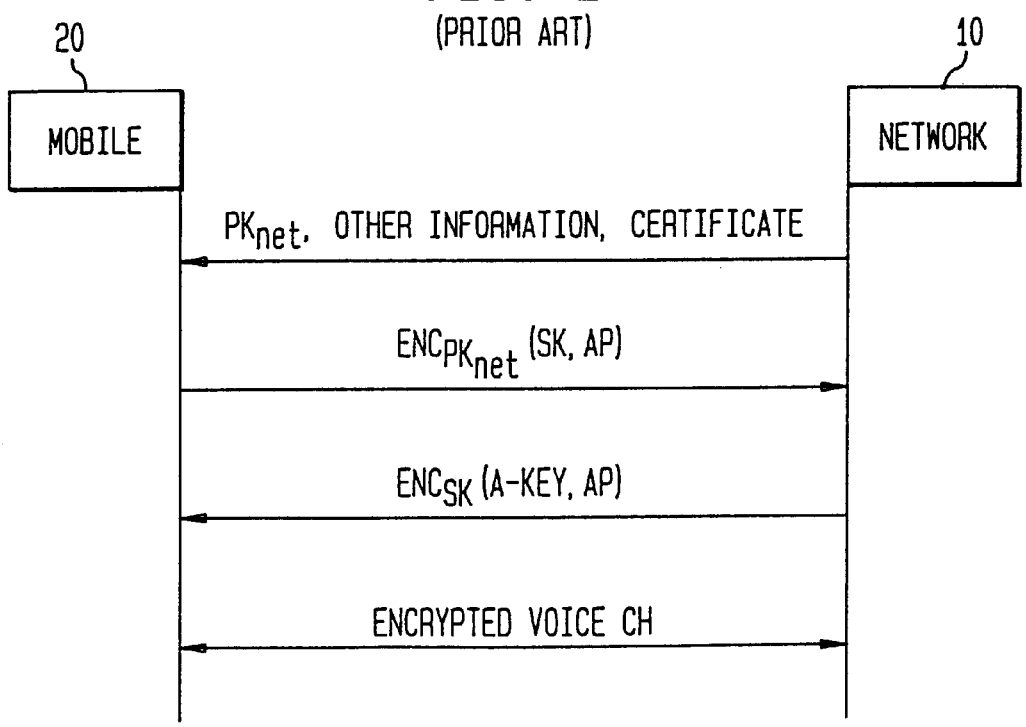
FIG. 2 shows the communication between a network and a mobile according to the Carroll-Frankel-Tsiounis key distribution protocol.

The method for transferring sensitive information using initially unsecured communication will be described as applied to the over-the-air communication of an A-key between the network 10 and the mobile 20. It should be understood, that the present invention applies to the communication of any information (not just an A-key) between parties (not just a mobile and a network and not just over-the-air communication). For example, the method according to the present invention applies to communication between parties over the internet. However, for purposes of clarity, the method according to the present invention will be described as applied to the over-the-air communication of an A-key between the network 10 and the mobile 20.

FIG. 3 shows the communication between the network 10 and the mobile 20 according to the protocol of the present invention. As shown, the network 10 sends its public key $PK_{net}$, other information, and the certificate to the mobile 20. Using the public key $PK_{CA}$ of the CA, the mobile 20 obtains the hash of the public key $PK_{net}$ plus the other information from the certificate. Namely, the encryption/decryption and hashing algorithms used by the CA and the public key of the CA are pre-stored in the mobile 20, and using the encryption/decryption algorithm and the public key $PK_{CA}$ of the CA, the mobile 20 encrypts the certificate to obtain the hash of the public key $PK_{net}$ and any other information. The mobile 20 also hashes the public key $PK_{net}$ plus the other information received in the clear from the network 10 using the hashing algorithm.

The mobile 20 then verifies the authenticity of the public key $PK_{net}$ if the result of the hash matches that obtained from the certificate.

Having verified the authenticity of the public key $PK_{net}$, the mobile 20, using a random number generator disposed therein, generates a random number as a session key SK. The mobile 20 encrypts the session key SK and the identification number ID of the mobile 20 using $PK_{net}$ according to the well-known encryption/decryption algorithm ENC, and sends the encrypted result to the network 10. Preferably, the encryption/decryption algorithm ENC is the well known RSA algorithm. Except where noted to the contrary, all encryption and decryption described in the specification is performed according to the RSA algorithm. One skilled in the art, however, will recognize that other encryption/decryption algorithms, such as the Rabin algorithm, and that more than one algorithm can be used.

The network 10 decrypts the output of the mobile 20 using the decrypting key $dk_{net}$ associated with the public key $PK_{net}$ to obtain the session key SK and the identification number ID of the mobile 20. Using the session key SK as a root key (A-key), the network 10 establishes an encrypted voice channel between itself and the mobile 20 according to any well-known protocol such as IS41-C. Furthermore, the voice channel is message authenticated using the any well-known message authentication algorithm such as the HMAC algorithm.

Over the encrypted voice channel, the network service provider requests authorizing information (e.g., credit card information for billing purposes) from the mobile user. Assuming the authorizing information is accepted, the protocol continues. However, if the authorizing information is not accepted, the protocol terminates.

Once the authorizing information is accepted, the network 10 establishes an encrypted and message authenticated control channel to the mobile 20 using any well-known protocol such as in IS41-C for encryption and any well-known protocol such as HMAC for message authentication. In these protocols, the session key SK is used as the root or A-Key.

Preferably, the protocol used for encryption, such as the IS41-C protocol, is modified to perform authentication as disclosed in one of two concurrently filed applications by an inventor of the subject application entitled METHOD FOR TWO PARTY AUTHENTICATION and METHOD FOR PROTECTING TRANSFER OF INFORMATION OVER AN UNSECURED COMMUNICATION CHANNEL. The concurrently filed applications entitled METHOD FOR TWO PARTY AUTHENTICATION and METHOD FOR PROTECTING TRANSFER OF INFORMATION OVER AN UNSECURED COMMUNICATION CHANNEL, are hereby incorporated by reference in their entirety.

Furthermore, instead of separately establishing the authenticated and encrypted voice channel and the authenticated and encrypted control channel. Both of these channels are established at the same time. As a further alternative, the authorizing information does not have to be transferred over a voice channel, and as a still further alternative, the same encrypted and authenticated communication channel is used to transfer both the authorizing information and the sensitive information.

Over the authenticated and encrypted control channel, the network 10 sends an A-key to the mobile 10. Furthermore, the network 10 associates this A-key with the mobile 20 using the ID received from the mobile, and will issue the same A-key for each OTASP attempt. Communication between the mobile 20 and the network 10 is then reconfigured based on the newly transmitted A-key.

Unlike the CFT key distribution protocol, in one embodiment of the protocol according to the present invention, the network associates a particular A-key with a mobile via the identification number, and does not need to use a randomly established A-key for each OTASP. Furthermore, because the protocol according to the present invention does not establish the A-key until after receiving the user's authorizing information, the protocol is resistant to man-in-the-middle attacks as discussed above. Also, the mobile's id is encrypted to the network preventing the denial of service attack.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for transferring sensitive information to a first party using initially unsecured communication, comprising:

(a) receiving, at said first party, a public key of a second party;

(b) producing an encryption result by performing keyed encryption on at least a first random number using said public key;

(c) transferring said encryption result from said first party to said second party;

(d) transferring authorizing information to said second party over a first encrypted and authenticated communication channel established using said first random number; and (e) receiving sensitive information from said second party over a second encrypted and authenticated communication channel established using said first random number.

2. The method of claim 1, wherein said step (a) receives a certificate of said public key along with said public key; and further including, (f) verifying said public key based on said certificate.

3. The method of claim 1, wherein said step (b) produces said encryption result by performing keyed encryption on said first random number and an identifier for said first party using said public key.

4. The method of claim 1, wherein said first and second encrypted and authenticated communication channels are a same channel.

5. The method of claim 1, wherein said step (d) comprises:
   (d1) establishing said first and second encrypted and authenticated communication channels using said first random number; and
   (d2) transferring authorizing information to said second party over said first encrypted and authenticated communication channel.

6. The method of claim 1, wherein said first party is a mobile and said second party is a network in a wireless communication system.

7. The method of claim 6, wherein said step (e) receives a root key, as said sensitive information, from said network.

8. The method of claim 6, wherein said first encrypted and authenticated communication channel is a voice channel.

9. The method of claim 1, prior to said step (b), furthe comprising:
   (f) generating at least said first random number.

10. A method for transferring sensitive information from a first party using initially unsecured communication channel, comprising:
    (a) outputting a public key of said first party;
    (b) receiving, at said first party, an encryption result from a second party, said encryption result being a result of performing keyed encryption on at least a first random number using said public key of said first party;
    (c) decrypting said encryption result to obtain said first random number;
    (d) receiving authorizing information from said second party over a first encrypted and authenticated communication channel established using said first random number; and
    (e) transferring sensitive information to said second party over a second encrypted and authenticated communication channel established using said first random number if said authorizing information is acceptable.

11. The method of claim 10, wherein said step (a) outputs a certificate of said public key along with said public key.

12. The method of claim 10, wherein said first and second encrypted and authenticated communication channels are a same channel.

13. The method of claim 10, wherein said step (d) comprises:
    (d1) establishing said first and second encrypted and authenticated communication channels using said first random number; and
    (d2) receiving authorizing information from said second party over said first encrypted and authenticated communication channel.

14. The method of claim 10, wherein said first party is a network in a wireless communication system, and said second party is a mobile.

15. The method of claim 14, wherein
    said encryption result is a result of performing keyed encryption on said first random number and an identifier for said mobile using said public key of said first party;
    said step (c) decrypts said encryption result to obtain said first random number and said identifier for said mobile; and
    said step (e) transfers a root key, as said sensitive information, to said mobile; and further including,
    (f) associating said root key with said identifier for said mobile.

16. The method of claim 14, wherein said step (e) transfers a root key, as said sensitive information, to said mobile.

17. The method of claim 14, wherein said first encrypted and authenticated communication channel is a voice channel.

* * * * *